S. N. STEWART.
COMBINATION RAILWAY CAR AND UNICYCLE AND COUPLING MEANS THEREFOR.
APPLICATION FILED OCT. 1, 1919.
1,342,137. Patented June 1, 1920.
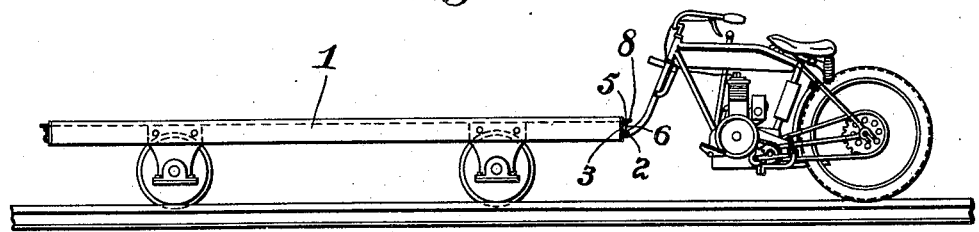
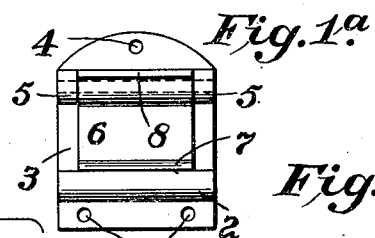
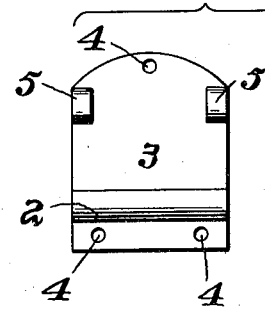 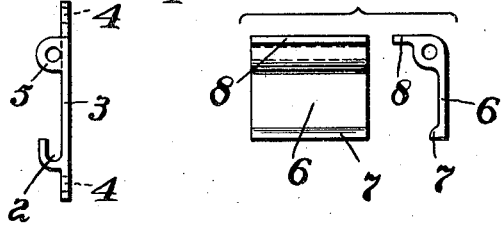
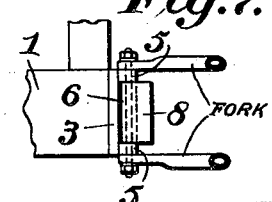
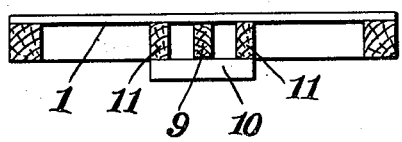
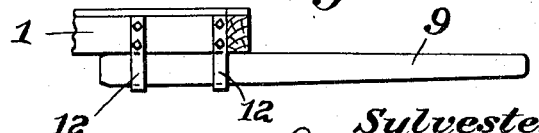
Inventor:
Sylvester N. Stewart,
by Spear, Middleton, Donaldson & Hall
Atty's.

UNITED STATES PATENT OFFICE.

SYLVESTER N. STEWART, OF DAYTON, OHIO.

COMBINATION RAILWAY-CAR AND UNICYCLE AND COUPLING MEANS THEREFOR.

1,342,137. Specification of Letters Patent. Patented June 1, 1920.

Application filed October 1, 1919. Serial No. 327,823.

*To all whom it may concern:*

Be it known that I, SYLVESTER N. STEWART, a citizen of the United States, and resident of Dayton, Ohio, have invented certain new and useful Improvements in Combination Railway-Cars and Unicycles and Coupling Means Therefor, of which the following is a specification.

I aim to provide a combined railway car and propelling means therefor which will enable an operator or workman to propel the car along a railway track and will also permit ready attachment of the propelling means to, and separation of the same, from the car.

In carrying out my invention I provide means whereby a portion of an ordinary bicycle or motorcycle may be employed for propelling the car along the track, said motorcycle or bicycle being converted into a unicycle with its one wheel running on the track.

It will be understood that while I describe one unicycle in connection with the car, two may be used if desired, one on each of the rails of a railway track.

The invention is shown in the accompanying drawings in which—

Figure 1 represents a side view of a car with the unicycle attached thereto.

Fig. 1ª is a face view of the complete coupling.

Fig. 2 represents in face view and in edge elevation one of the members of the coupling or clutch which is employed to enable the unicycle to be attached to the car.

Fig. 3 is a face view and an edge view of the movable member of the clutch.

Fig. 4 is a view of the car platform partly in section.

Fig. 5 is a view of a modification of the platform.

Fig. 6 is a detail view of a lifting bar for the car platform in connection therewith.

Fig. 7 is a detail view of a connection between the fork of the unicycle and the car platform.

In the drawings 1 indicates a car of substantially ordinary form such, for instance, as used by workmen or section hands and ordinarily known as a push car, it being adapted to be set on the rails or removed therefrom by a gang of section hands to carry tools or to carry the men from place to place along the section of track assigned to them for keeping in repair. At the end of this car and supported upon any suitable part of the structure thereof, a clutch or coupling is mounted adapted to receive the front cross pin or axle of a bicycle or motorcycle from which the front wheel has been removed, which axle or pin takes the place of the ordinary axle in the front forks and which in ordinary practice supports the front wheel. This pin passes through both arms of the fork and is adapted to rest in a trough or recess 2 of the main plate or clutch member 3 which is secured to the car by bolts or other fastenings passing through the openings 4 into or through the frame work of the car. This main member is provided with ears 5 near its top, receiving a journal pin upon which is pivotally supported the keeper 6 which depends from its pivot and has a thickened or enlarged lower edge at 7 adapted to overlie the socket 2 of the main member and hold the cross pin of the front forks of the unicycle therein. The keeper 6 is provided with a finger piece 8 by which it may be tipped to remove its lower end or edge 7 from over the clutch or recess 2 of the main member thereby to enable the cross pin of the front fork of the unicycle to be placed in position or removed therefrom. The clutch 2 is of such depth that the cross pin of the unicycle will about fill the socket so that when the keeper is in its holding position with its thickened lower edge 7 directly over the cross pin, it will be held securely in place with no looseness of the parts at this point. It will be noticed that the clutch or coupling is of considerable width and provides a comparatively long bearing in its socket 2 for holding the bolt or cross pin and the width may be such that the coupling member will extend from the inner face of one fork prong to the other to avoid side play of the front end of the unicycle in relation to the car. The attachment afforded by the clutch holds the fork rigid in its horizontal plane so that when the rear wheel of the motorcycle or bicycle is resting on the track, it will be held thereon against lateral play and will track properly with the wheels of the car.

In order that the car may be readily removed from the tracks or replaced thereon, I provide means for holding a lifting bar, and while this means may assume various forms, I show in Fig. 4 a space or socket beneath the car which is adapted to receive a lifting bar 9. This space or socket for the lifting bar is provided in a simple manner by affixing a piece of planking indicated at 10 on the underside of the longitudinal beams 11 forming parts of the ordinary car structure. By inserting the lifting bar in this space or socket, the workmen may lift the car from the track at one end and then by removing the lifting bar from this end of the car and inserting it in a similar space or socket at the other end, this latter end may be removed and thus the car entirely shifted from the track. In place of the structure shown in Fig. 4 I may employ a U-shaped iron screwed or bolted to the beam as shown at 12 providing a space or socket for the insertion of the lifting bar, and preferably I would employ a pair of these U-shaped irons, spaced apart but in longitudinal alinement with each other so that the lifting bar when inserted would engage within the space of each of these iron U-shaped members.

It will be understood from the above description that the section hands can readily attach the unicycle to the car or detach it therefrom and the car and the unicycle can all be placed in position or removed from the tracks quickly and with a minimum expenditure of labor.

As above stated an ordinary bicycle or motorcycle may be used by simply taking off its front wheel. The forks are held to the railway car against turning about their usual substantially vertical or inclined axis and by reason of this fixture the rear wheel of the motorcycle is compelled to track with the wheels of the car.

It will be obvious that the tire of the unicycle may be of substantially ordinary form or may be grooved or concaved in order to fit the rail.

I claim as my invention:

1. In combination with a railway car, a unicycle having its frame attached at its front end thereto and having its single wheel supported in relation to the point of attachment so as to run upon the track, substantially as described.

2. In combination with a railway car, a unicycle attached removably thereto and having its single wheel positioned to run on the track, substantially as described.

3. In combination with a railway car, a unicycle comprising a frame of an ordinary bicycle or motorcycle from which the front wheel has been removed, with means for attaching the front forks of the frame to the car, the ordinary rear wheel running upon the track, substantially as described.

4. In combination with a railway car, a unicycle having a frame with a front fork, a cross pin in the front fork and a coupling on the car to receive the said cross pin, the single wheel of the unicycle running upon the track, substantially as described.

5. In combination with a railway car, a unicycle having a frame with a front fork and a cross pin and a clutch on the car, having means to support the cross pin and hold it against upward displacement and also engaging the fork to prevent lateral displacement, substantially as described.

6. In combination with a railway car, a unicycle having a horizontal pin at its front end, a clutch or coupling having an elongated socket or seat to receive the said cross pin and a keeper to overlie the cross pin to hold it down in the socket, substantially as described.

7. In combination with a railway car, a unicycle having a horizontal pin at its front end, a clutch or coupling having an elongated socket or seat to receive the said cross pin and a keeper to overlie the cross pin to hold it down in the socket, said keeper being pivoted to the main member of the clutch and having its lower edge located at the open top of the socket, substantially as described.

8. A clutch for connecting a unicycle with a railway car comprising a main member, an elongated open top socket or seat to receive a cross bolt or pin of the unicycle and a keeper movably mounted and overlying the socket, substantially as described.

9. A clutch for connecting a unicycle with a railway car comprising a main member, an elongated open top socket or seat to receive a cross bolt or pin of the unicycle and a keeper movably mounted and overlying the socket, said keeper being pivoted to the main plate and having a finger piece by which it may be manipulated, substantially as described.

10. A railway car having a horizontal socket at the end and a lifting bar having an end portion removably fitted to said socket and adapted to lift the car, substantially as described.

11. In combination with a unicycle having a front standard or fork, and a clutch to attach said fork or standard to a railway car and hold said standard or fork against turning about its axis and relative to the car, substantially as described.

12. A clutch for attaching a unicycle to a railway car having a seat for receiving the front fork or standard of the unicycle and holding it against turning about its axis and relative to the car, substantially as described.

In testimony whereof, I affix my signature.

SYLVESTER N. STEWART.